(12) United States Patent
Fisher et al.

(10) Patent No.: US 7,928,908 B2
(45) Date of Patent: Apr. 19, 2011

(54) APPARATUS AND METHOD FOR DETERMINING RECEIVER PERFORMANCE IN A MULTILATERATION SYSTEM

(75) Inventors: James Joseph Fisher, Romsey (GB); Philip Edward Roy Galloway, Romsey (GB); Timothy John Quilter, Romsey (GB); Robert John Weedon, Romsey (GB)

(73) Assignee: Roke Manor Research Limited, Romsey (GB)

( * ) Notice: Subject to any disclaimer, the term of this patent is extended or adjusted under 35 U.S.C. 154(b) by 15 days.

(21) Appl. No.: 11/994,462

(22) PCT Filed: May 4, 2006

(86) PCT No.: PCT/EP2006/062073
§ 371 (c)(1),
(2), (4) Date: Sep. 15, 2008

(87) PCT Pub. No.: WO2007/003455
PCT Pub. Date: Jan. 11, 2007

(65) Prior Publication Data
US 2009/0027270 A1    Jan. 29, 2009

(30) Foreign Application Priority Data

Jul. 1, 2005    (GB) .................................. 0513483.8

(51) Int. Cl.
*G01S 3/02*    (2006.01)
*G01S 5/06*    (2006.01)

(52) U.S. Cl. ......... 342/465; 342/463; 342/451; 342/387
(58) Field of Classification Search .................. 342/387, 342/385, 386, 465, 451, 463
See application file for complete search history.

(56) References Cited

U.S. PATENT DOCUMENTS

| 6,094,169 A * | 7/2000 | Smith et al. .................... 342/465 |
| 6,344,820 B1 | 2/2002 | Shiomi et al. |
| 6,360,078 B1 | 3/2002 | Driedger et al. |
| 6,968,194 B2 * | 11/2005 | Aljadeff et al. ............. 455/456.1 |

FOREIGN PATENT DOCUMENTS

| DE | 10053959 A1 | 6/2002 |
| EP | 0385600 A2 | 9/1990 |
| EP | 1045256 A1 | 10/2000 |

* cited by examiner

*Primary Examiner* — Thomas H Tarcza
*Assistant Examiner* — Cassi Galt
(74) *Attorney, Agent, or Firm* — Crowell & Moring LLP

(57) ABSTRACT

In a multilateration system receivers are grouped into two groups. The first group is used to determine a position of a signal source, for example, an aircraft equipped with a SAR transponder. From the determined position, predicted time of arrival values are produced for the second group receivers. These are compared with the actual time of arrival values for the signals arriving at the second group receivers. A difference is determined and then the variation of that difference is determined as the aircraft travels in its track. The groupings are then varied and further variations determined. When the minimum variation is determined an alert is given that the second group has a receiver which is operating with a larger than desirable group time delay.

10 Claims, 5 Drawing Sheets

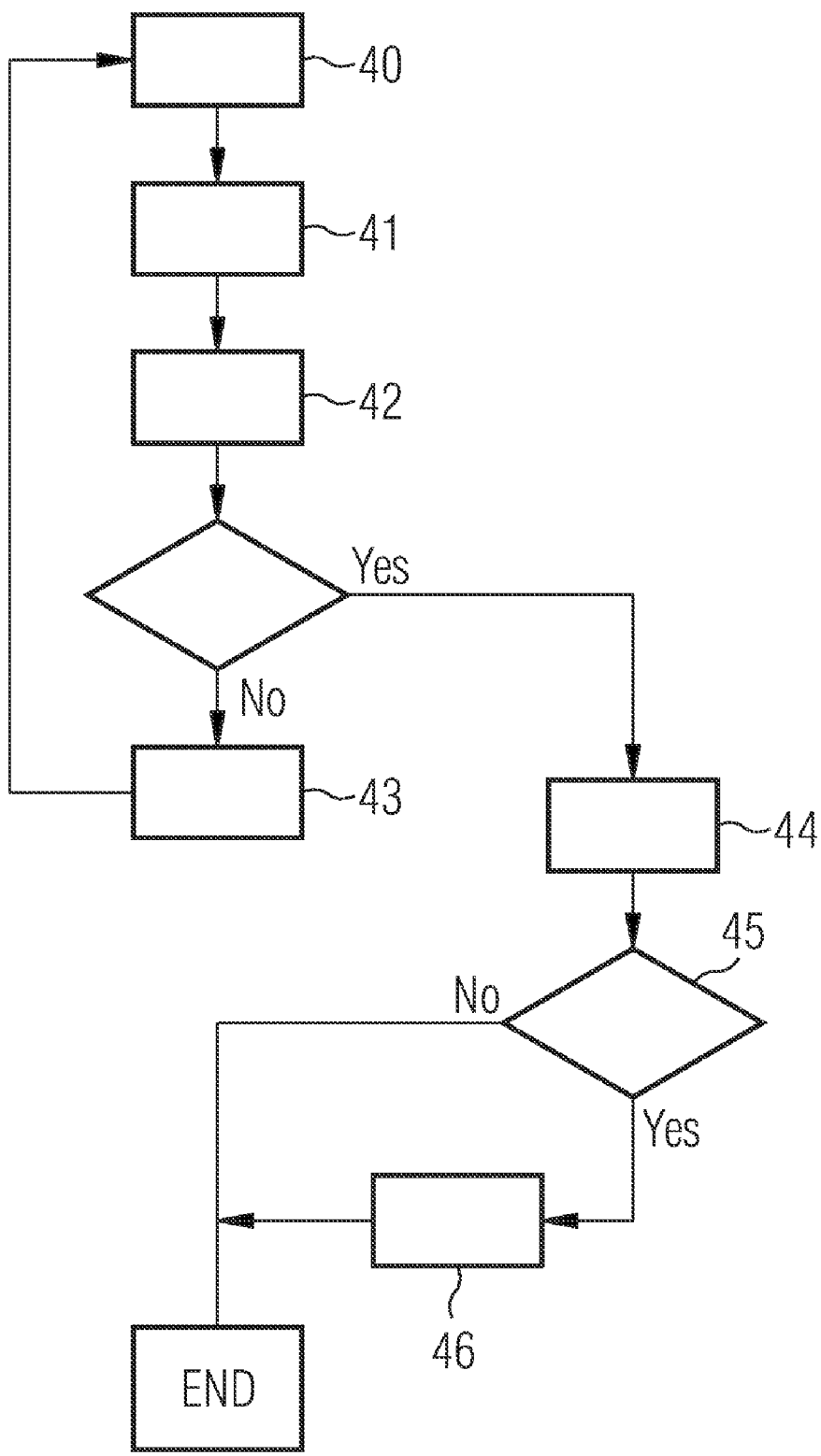

APPARATUS AND METHOD FOR DETERMINING RECEIVER PERFORMANCE IN A MULTILATERATION SYSTEM

BACKGROUND AND SUMMARY OF THE INVENTION

This invention relates to a multilateration system for determining a position of an object.

Multilateration systems are used to provide, in particular, the position of aircraft in flight or on airport runways. A signal transmitted by a transmitter on the aircraft is received by a number of receiver stations at known locations. The signal is transmitted by a 1090 MHz Secondary Surveillance Radar (SSR) transponder and is one of a number of known code types or formats Mode A/C and mode S. By comparing the time of arrival of the signal at each of the receiver stations and with the knowledge of their locations it is possible to calculate the position of the aircraft at the time of transmission. Such a system and a multilateration technique is described in patent GB2250154.

It will be appreciated that in order to accurately determine the position, it is necessary to cater for variations in apparent path length between parts of the system. This is in order that meaningful difference in time of arrival values for the signal can be derived. This can give rise to a factor called group time delay. Aging of components, for example, may cause a variation in the group time delay which may require servicing of parts of the system or other remedial action or correction.

The present invention arose in an attempt to determine which receiver in a group of receivers in multilateration system was experiencing a significant group time delay.

According to the invention there is provided apparatus for identifying which receiver in a plurality of receivers in known positions in a multilateration system is experiencing a significant group time delay comprising for in a first and subsequent pass: means to determine from a first group of receivers a detected position of a signal source; means to determine from the detected position and the known positions of a receiver or receivers of a second group predicted difference in time of arrival values for the signal for the second group; means to compare the predicted difference in time of arrival value with an actual difference in time of arrival value at the second group to derive a difference in time of arrival difference; means to derive a variation in successive difference in time of arrival differences; and means to determine when there is a significant variation in the difference in time of arrival.

Preferably, means are provided to allocate receivers to the first and second group. In the preferred embodiment the receivers are allocated such that all the receivers participate in the first group and also the second group.

The inventors have determined that when the lowest variation is experienced then the receiver in the second group is that having the greatest offset error. This because the first group is utilised to provide the position information which does not involve the use of the poorly performing receiver. This receiver may be adjusted or serviced as required, or the error may be compensated within the processing.

The invention also provides a method.

BRIEF DESCRIPTION OF THE DRAWING

A specific embodiment of the invention will now be described, by way of example only, with reference to the drawing in which:

FIG. 4 is a diagram of steps carried out in the method; and

DETAILED DESCRIPTION

Figure 1:
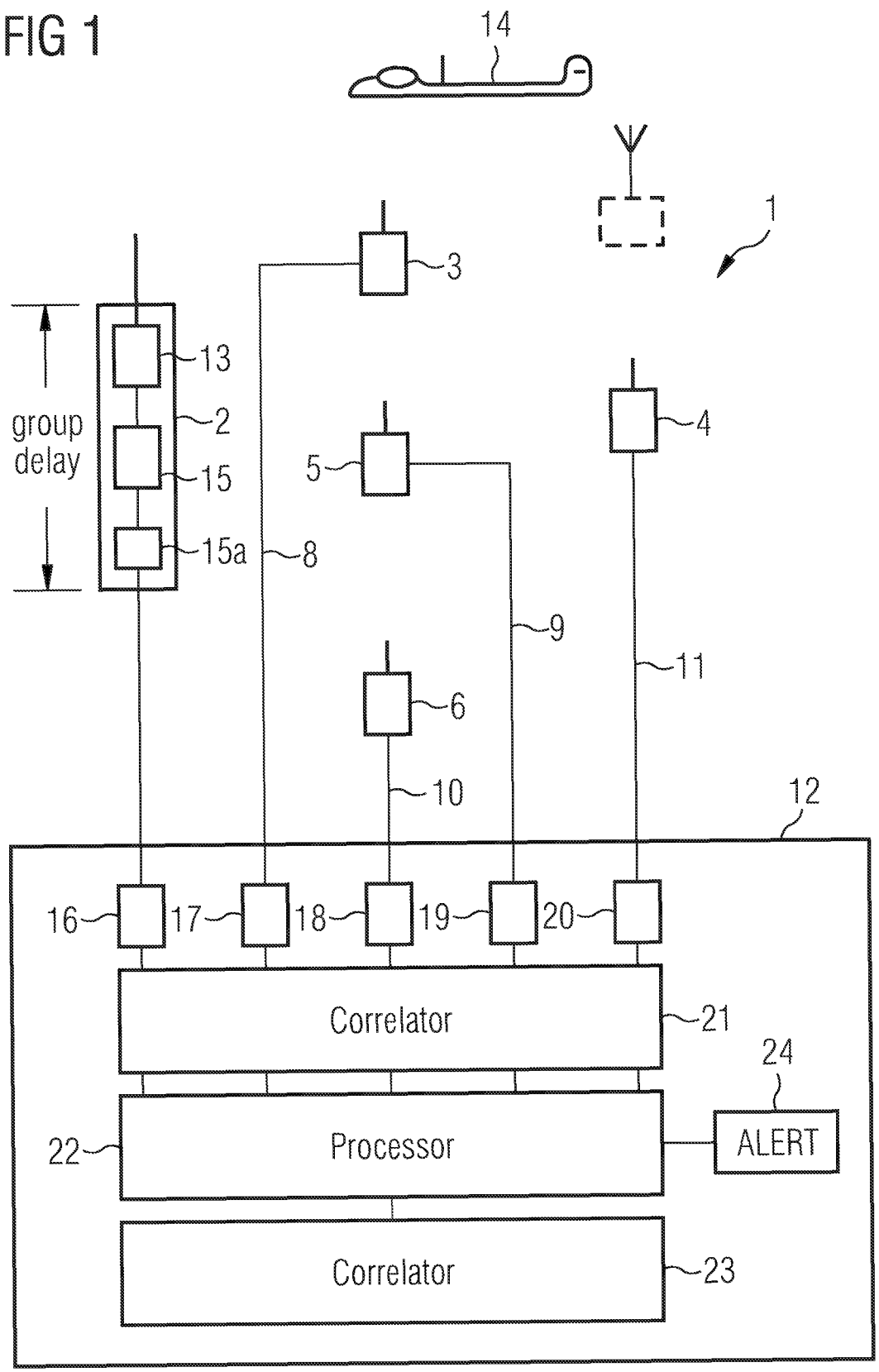
FIG. 1 shows a multilateration system and apparatus in accordance with the invention.

As is shown in FIG. 1, a multilateration system 1 includes five receivers 2 to 6 linked by communication links 7 to 11 (optical fibre) forming a Wide Area Network to a central processing subsystem 12. Each receiver is nominally identical and comprises as is shown in receiver 2 a receiver section 13 which detects and converts a received RF signal transmitted from an aircraft 14 into a form which is suitable for digitising in digitiser 15. The digitiser 15 performs an analogue to digital conversion and a code extractor 15a, looking for a particular SSR code, detects the code in a time window and transmits a digital signal over the communication path to the central processing subsystem 12 noting the time of arrival of the code in the window. Within each receiver there is a delay associated with the sections 13, 15 and 15a called the group delay. This causes an error in the determined time of arrival of a signal. As components age it is possible for this error to become significant and the aim of the invention is to detect this. A multilateration technique of a known type is applied to these times of arrival values to determine the position of the aircraft 14 and this is carried out by the central processing subsystem 12.

The central processing subsystem 12 is depicted here as a separate unit but it may be co-located at one of the receivers. It includes a number of ports connected to the communications links 7 to 11. The ports are coupled via filters 16 to 20 to a correlator 21. These filters remove noise from the signals which can lead to positional errors. The correlator 21 correlates the time of arrival data into a set of arrays containing groups of replies that may originate from the same transmission.

The correlated arrays are coupled to a processor 22 which performs a multilateration to derive a position of the aircraft 2 in a known manner and to pass the position data to a tracking application 23 which displays the position to an air-traffic controller.

Figure 2:
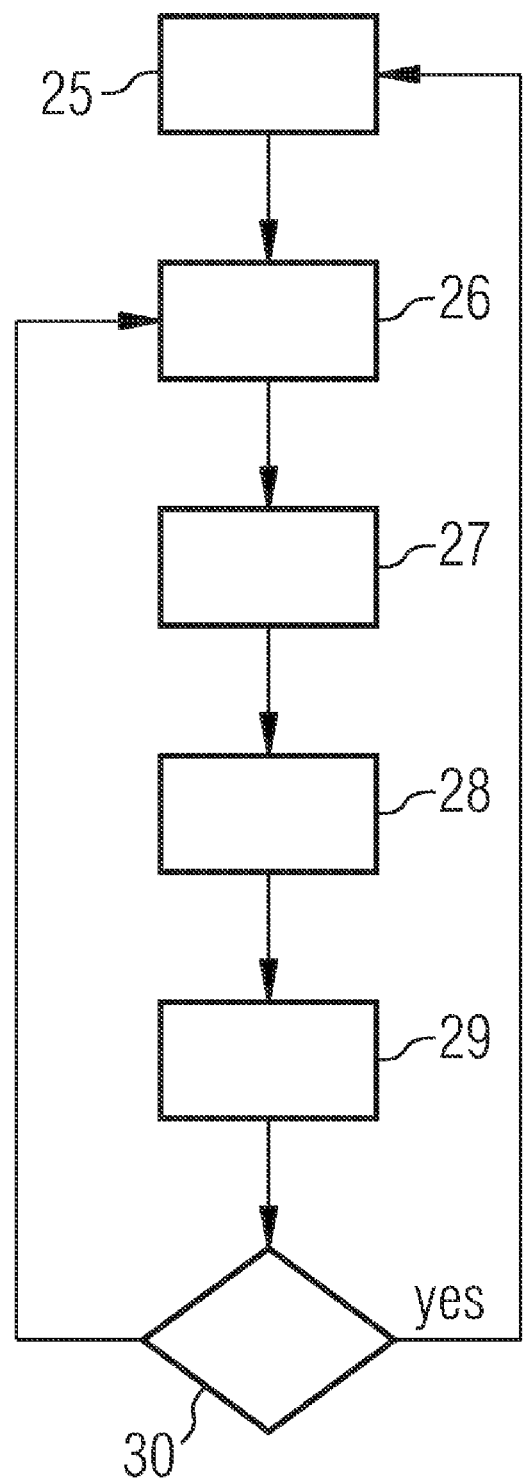
FIG. 2 is a diagram of steps involved in a method in accordance with the invention.

The processor 22 also provides an output to an alert system 24 which provides an alarm when one of the receivers is detected as having an abnormal group delay. Alternatively, the effect of the group delay can be removed within the multilateration technique performed by processor 22. The group delay detection is carried out by an application running on the processor 22 as will now be described with reference to FIG. 2.

Figure 3A:
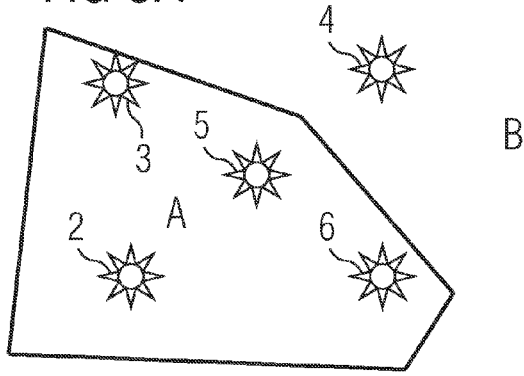
FIG. 3 is an explanatory figure showing various groupings of the receivers in the multilateration system.
Figure 3B:
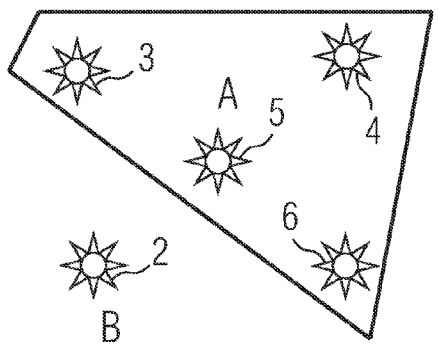
Figure 3C:
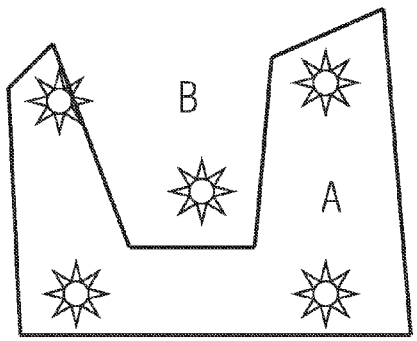
Figure 3D:
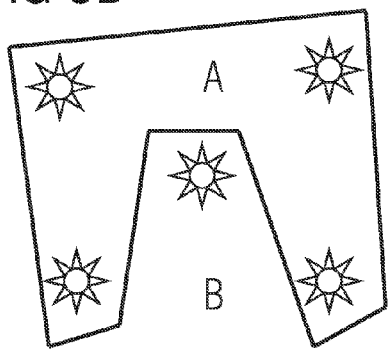
Figure 5A:
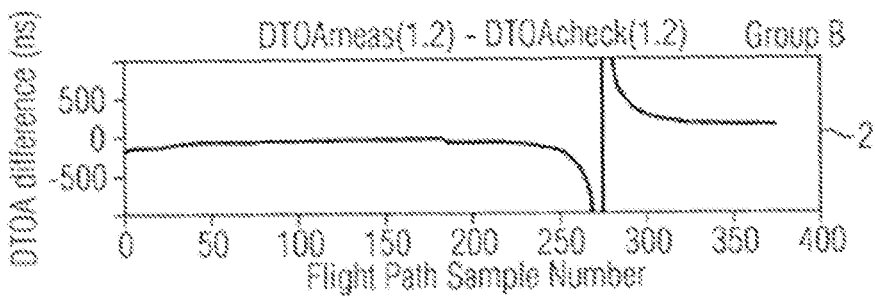
FIG. 5 shows sets of variations in difference in time of arrival differences for various groupings of receivers.
Figure 5B:
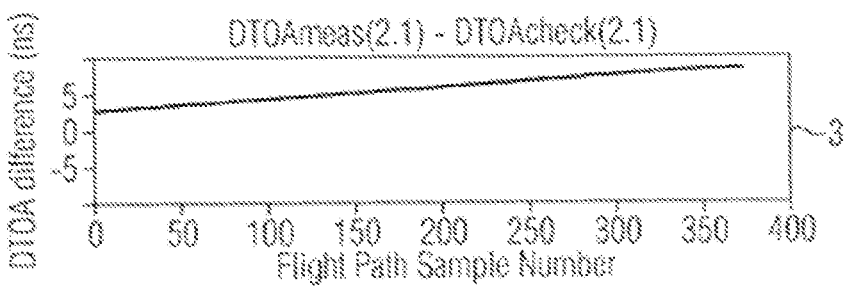
Figure 5C:
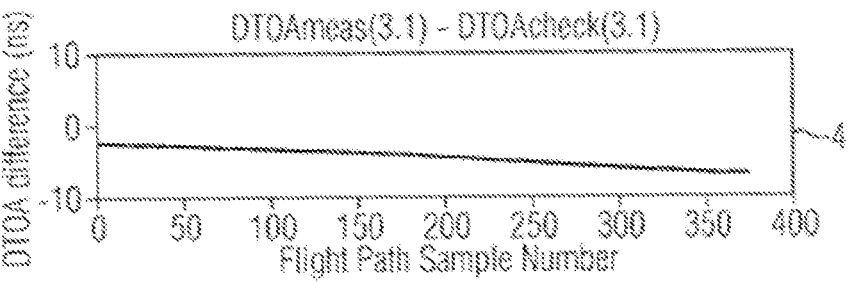
Figure 5D:
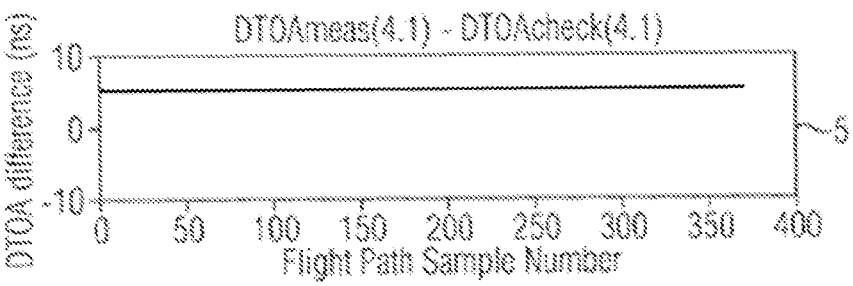
Figure 5E:
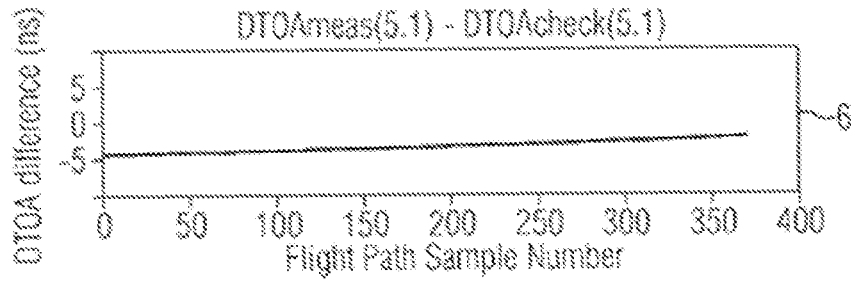

In a first step 25, the receivers are allocated to two groups, group A and group B. Four of the five receivers are allocated to group A and one to group B. In this case the group A is shown in FIG. 3a as including receivers 2,3,5 and 6. Group B includes receiver 4.

The group A receiver outputs are used to calculate a position for the aircraft 14 in step 26.

The calculated position is used to determine, in step 27, a predicted difference in time of arrival for the receiver 4 in group B, using a receiver from group A as a reference. From this, in step 28, a difference in time of arrival difference is calculated by taking the modulus of the predicted difference in time of arrival using a receiver from group A as a reference less the actual detected difference in time of arrival using the same receiver from group A as a reference.

The difference in time of arrival difference value is recorded to a set of values held in memory in step 29.

Next, a new group is created as shown in FIG. 3(*b*). It will be seen that group A now includes receiver 3, 4, 5 and 6 and group B includes receiver 2. The difference values for the first groupings are maintained in memory.

The process repeats as before to save time of arrival difference values for the new groupings in memory. Further groupings such as those depicted in FIGS. 3(*c*) and 3(*d*) are made and further sets of difference values determined until all the receivers have been used in turn as the group B site. That is to say each receiver has a turn as being the receiver to be tested.

The process is to be carried over a segment of the aircraft's flight path and thus if in step 30 the end of the flight path segment has not been reached then the process returns to step 26 and determines the next position of the aircraft.

If the end of the segment has been reached then the standard deviation of each of the sets of difference in time of arrival differences is determined as shown in FIG. 4. In a first step 40, a first set of the difference in time of arrival differences are accessed and the standard deviation is determined in step 41. The standard deviation is stored in step 42. If there are more sets to consider then the next set is accessed steps 43 and 40 and the process repeated. If the set is the last, then all the standard deviations are compared in step 44 and the smallest deviation identified. The difference is then compared with a threshold in step 45. In the event of the threshold being exceeded then an alarm is initiated in step 46. The alarm can take the form of an alert to instruct service personnel that the identified receiver requires attention. Alternatively, the effect of the group delay can be removed by compensating for the difference within the multilateration technique performed by processor 22

FIG. 5 shows typical sets of difference in time of arrival differences for various groupings of the receivers. It will be seen that the sets of data a), b), c) and e have a variation in the difference in the difference in time of arrival values. Set d) has a constant difference. This indicates that the receiver for that set which is not in group A is the one which has the greatest offset which in the depicted case is receiver 5. These examples depict a low noise situation. The filters are designed to remove noise from the incoming signals but it will be appreciated that in certain situations more noise will be present.

In a preferred embodiment, a rolling average filter is used to filter the noise. This provides values based on one hundred and fifty elements and produces an average for the last one hundred and fifty elements. The number of elements will be chosen depending upon noise and the aircraft trajectory. A Kalman filter may be used as the filter.

To further reduce the effect of noise, the measurements may be taken over a number of aircraft flight path segments or tracks. The receiver which has a significant group delay may then be more readily identified.

Whilst in the described embodiment, the aircraft produces the required signal it will also be possible to provide a signal from another source. This may for example, include a fixed source at a known position shown in broken outline in FIG. 1. This source may be seen by some or all of the receivers. In using this as the source the steps of determining the position of the source may be dispensed with since the position is already known. In the event that the fixed location source is only "seen" by some of the receivers, the others may utilise the aircraft as the source as before.

In the described embodiments, the second group has one receiver allocated to it for each pass. In other embodiments the second group may have more than one receiver.

The invention claimed is:

1. Apparatus for identifying which receiver in a plurality of receivers in known positions in a multilateration system is experiencing a significant group time delay comprising for in a first and subsequent pass:
   a processor that
      determines from a first group of receivers a detected position of an aircraft providing a signal source;
      determines from the detected position of the aircraft and the known positions of a receiver or receivers of a second group a predicted difference in time of arrival of the signal from the aircraft for the second group, using a receiver from the first group as a reference;
      compares the predicted difference in time of arrival with an actual difference time of arrival at the second group to derive a difference in time of arrival difference;
      derives a variation in successive difference in time of arrival differences over a segment of a flight path of the aircraft; and
      determines, in the absence of a significant variation in successive differences between predicted and actual time of arrival differences, and in the presence of a difference between predicted and actual time of arrival differences, that a receiver in the second group is experiencing significant time delay.

2. Apparatus as claimed in claim 1 wherein grouping of receivers varies between passes.

3. Apparatus as claimed in claim 2 wherein the second group is formed of one receiver of the plurality.

4. Apparatus as claimed in claim 3 wherein each of the plurality of receivers forms, for at least one pass, the second group.

5. Apparatus as claimed in claim 1 wherein the determination of when there is a difference in predicted and actual time of arrival differences involves a comparison of the differences with one of a threshold and/or a difference derived from at least one earlier pass.

6. Apparatus as claimed in claim 1 wherein the at least one filter is a Kalman filter.

7. A multilateration system comprising apparatus as claimed in claim 1.

8. A method of determining which receiver of a plurality of receivers of known locations in a multilateration system is experiencing a significant group delay comprising the steps of:
   determining the position of an aircraft providing a signal source using a first group of the plurality of receivers;
   determining from the determined position of the aircraft, and the known location of a receiver in a second group, a predicted difference time of arrival of the signal from the aircraft at that receiver, using a receiver from the first group as a reference;
   determining a difference in the difference in time of arrival from the predicted and the actual difference in time of arrival;
   deriving from a set of differences a variation in the differences over a segment of a flight path of the aircraft; and
   in the absence of a significant variation in differences between predicted and actual time of arrival differences, and in the presence of a difference between predicted and actual time of arrival differences, concluding that the receiver in the second group is experiencing a significant group time delay.

9. A method as claimed in claim 8 comprising the steps of:
for subsequent passes re-allocating at least some of the receivers between the first and the second group.

10. A method of determining which receiver of a plurality of receivers of known locations in a multilateration system is experiencing a significant group delay comprising the steps of:
- a) selecting some of the plurality of receivers as a first group of receivers;
- b) selecting a remaining receiver as a second group of receivers;
- c) determining the position of an aircraft providing a signal source using the first group of the plurality of receivers;
- d) determining from the determined position of the aircraft, and the known location of the receiver in the second group, a predicted difference time of arrival of the signal from the aircraft at that receiver, using a receiver from the first group as a reference;
- e) determining a difference in the difference in time of arrival from the predicted and the actual difference in time of arrival as a first difference in a set of differences;
- f) changing receivers in the first and second groups of receivers over a segment of a flight path of the aircraft and repeating steps a)-e) until each of the plurality of receivers is selected as part of the second group of receivers to produce further sets of differences;

deriving from each set of differences a variation in the differences; and in the absence of a significant variation in differences between predicted and actual time of arrival differences, and in the presence of a difference between predicted and actual time of arrival differences, concluding that a receiver in the second group is experiencing a significant group time delay.

* * * * *